United States Patent [19]

Hatchadoorian et al.

[11] Patent Number: 4,468,426
[45] Date of Patent: Aug. 28, 1984

[54] ADHERABLE REINFORCED POLY(ETHYLENE TEREPHTHALATE) COMPOSITE SHEET

[75] Inventors: Edward Hatchadoorian; George J. Ostapchenko; Harlan S. Young, all of Wilmington, Del.

[73] Assignee: E. I. Du Pont de Nemours and Company, Wilmington, Del.

[21] Appl. No.: 444,086

[22] Filed: Nov. 24, 1982

[51] Int. Cl.³ .............................................. B32B 7/02
[52] U.S. Cl. .................................... 428/213; 428/297;
428/303; 428/325; 428/332; 428/333; 428/343;
428/355
[58] Field of Search ............................... 428/213–216,
428/287, 292, 293, 294, 295, 297, 343, 332, 333,
355, 325

[56] References Cited

U.S. PATENT DOCUMENTS 3,935,358 1/1976 Wyeth et al. ..................... 428/166
3,959,432 5/1976 Wiley ................................. 264/171

FOREIGN PATENT DOCUMENTS 35835 9/1980 European Pat. Off. .
26006 4/1981 European Pat. Off. .

OTHER PUBLICATIONS

U.S. Application Ser. No. 390,683, filed 6-21-82, Hatchadoorian et al., (DuPont).

Primary Examiner—James J. Bell
Attorney, Agent, or Firm—Paul R. Steyermark

[57] ABSTRACT

Fiber-reinforced poly(ethylene terephthalate) sheet is laminated to a sheet of amorphous, adhesive copolyester at a temperature at which poly(ethylene terephthalate) is in a molten state. The resulting composite sheet is useful in making thermoformed articles in which one member is bonded to another member, for example, a face member and a backing member. The different members are arranged so that their copolyester layers face each other. Hollow thermoformed articles bonded with amorphous copolyester adhesive exhibit very good bond strength and minimum distortion.

10 Claims, 1 Drawing Figure

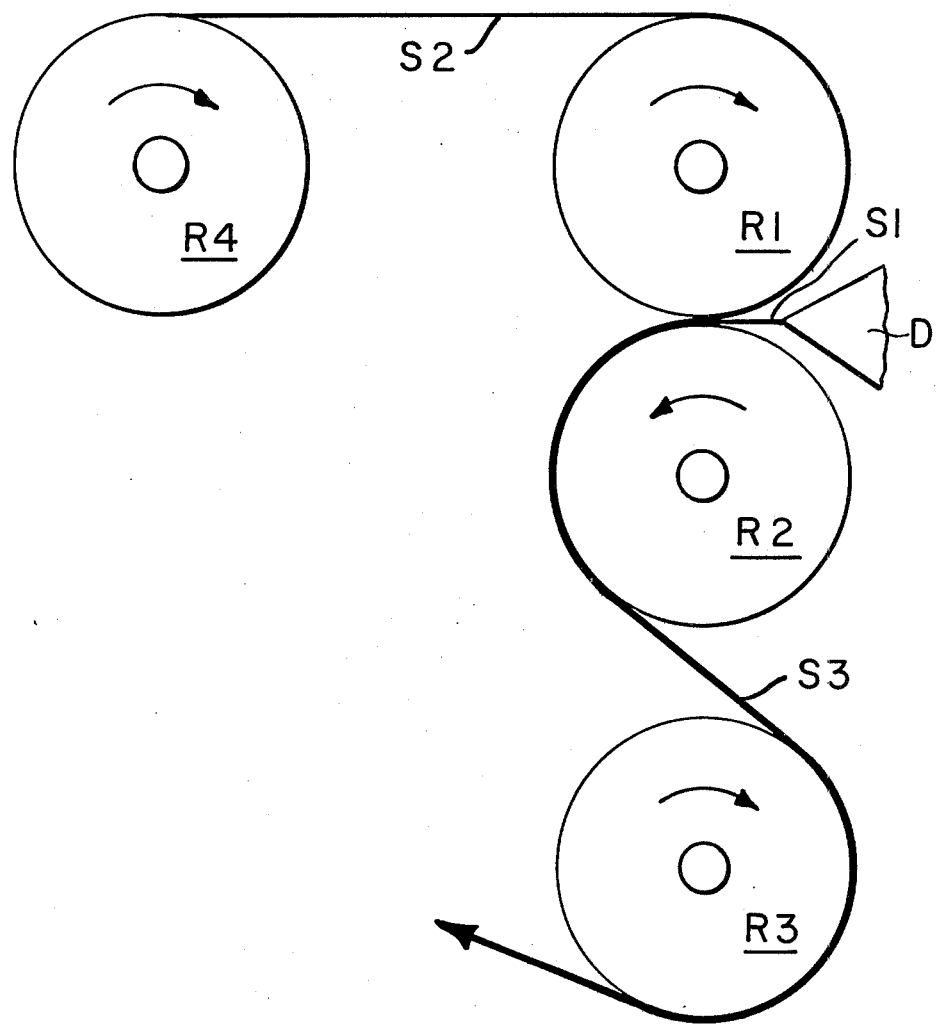

ADHERABLE REINFORCED POLY(ETHYLENE TEREPHTHALATE) COMPOSITE SHEET

BACKGROUND OF THE INVENTION

This invention relates to a thermoformable composite sheet having a major base layer of fiber-reinforced poly(ethylene terephthalate), sometimes hereafter referred to as PET, and a relatively thin layer of a thermoplastic adhesive material firmly attached to one side thereof. This invention also includes a process for making such thermoformable composite sheets.

Three-dimensional hollow articles can be thermoformed either in one operation, as taught, for example, in U.S. Pat. No. 3,953,358 to Wyeth or in separate operations, where parts are shaped as required, then bonded together into the desired article. A single mold process, which is preferred, still requires at least two separate thermoformable sheets, one of which may form a face member and the other one a backing member, which must be bonded to each other. Bonding may sometimes be accomplished by simply contacting both members in partly molten state under pressure. However, PET does not well adhere to itself at molding temperatures since molding is carried out well below its melting point. Self-bonding is even more difficult when PET is fiber-reinforced for greater rigidity. It is therefore necessary to use an adhesive material capable of bonding in a mold two fiber-reinforced PET sheets to each other. Such a material must adhere well to PET, be reasonably stable under the temperature and pressure conditions encountered in thermoforming, and bond thermoformed sheets into structures which will not deform or warp on cooling.

It also would be desirable to have available for thermoforming operations fiber-reinforced PET sheets having a layer of adhesive attached to one side thereof, so that coating individual sheets just prior to thermoforming would not be necessary.

SUMMARY OF THE INVENTION

According to this invention, there is provided a thermoformable composite sheet having a base layer of fiber-reinforced amorphous poly(ethylene terephthalate) in which the fiber distribution is balanced side to side and a layer of a thermoplastic, adhesive copolyester material firmly attached to one side of said base layer, the thickness of said adhesive layer being at most about 35% of the thickness of said composite sheet.

There is also provided a process for making the composite sheets of the present invention, wherein the adhesive material, in sheet form, is laminated to a fiber-reinforced PET sheet at a temperature at which PET is in molten state.

BRIEF DESCRIPTION OF THE DRAWING

The drawing shows schematically an embodiment of this invention wherein a copolyester sheet is laminated to a fiber-reinforced PET sheet on a three-roll finisher.

DETAILED DESCRIPTION OF THE INVENTION

Thermoformable fiber-reinforced PET sheets should be amorphous since their softening temperature increases with increasing crystallinity. The modulus also increases with increasing crystallinity, while elongation to break decreases, making the sheet difficult to thermoform. For the purpose of the present invention, amorphous PET has a degree of crystallinity of at most about 5%.

The degree of crystallinity of crystallized, reinforced plastic sheet is determined from density measurements as follows:

First, polymer density is calculated from the following equation:

$$D_2 = X_2/(1/D_s - X_1/D_1)$$

where
- $D_2$ = polymer density
- $X_2$ = polymer weight fraction
- $D_s$ = Sample sheet density
- $D_1$ = Reinforcing agent density
- $X_1$ = Reinforcing agent weight fraction The density of the sheet is determined by measuring the apparent loss of weight while the sheet is immersed in deaerated, distilled water and using the following equation:

$$D_s = D_H[WA/(WA - WH)]$$

where
- $D_H$ = Density of water taken as 1.0 g/cm$^3$
- $WA$ = Sample weight in air
- $WH$ = Sample weight in water The percent crystallinity is determined using the following equation:

$$\text{Percent Crystallinity} = [(D_2 - DA)/(DC - DA)] \times 100$$

where
- $DA$ = Density of amorphous polymer
- $DC$ = Density of 100% crystalline polymer For PET
- $DA = 1.333$ g/cm$^3$ and
- $DC = 1.455$ g/cm$^3$ For the determination of PET crystallinity it is necessary to have a PET sheet free of adhesive. The degree of crystallinity of a PET sheet in a composite structure of this invention can be determined after removal of the adhesive layer, for example, by selective dissolution in a solvent which is inert to PET. A good solvent for this purpose is trichloroethylene.

The fibrous reinforcing material may be either inorganic or organic and includes, for example, glass fibers, graphite fibers, quartz fibers, and high melting polyamide fibers such as, for example, Du Pont's Kevlar® aramid fibers. The amount of the reinforcing agent should be sufficient to increase the tensile strength and tensile modulus of the fiber-filled composition as compared with the unfilled base PET. The weight of the fibrous reinforcing material normally is about 5–50% by weight of the total composition, preferably 10–35%. The preferred reinforcing agent is glass fibers, especially those having an average length-to-diameter ratio of at least 10, preferably at most about 35. Shorter fibers may not provide adequate reinforcing effect, while longer fibers may be difficult to disperse in the polymer matrix in a uniform manner. Since glass fibers tend to break into smaller fragments in the extruder, the length-to-diameter ratio is determined following the extrusion. Obviously, the fibers should be neither too thin nor too thick, so that they can be handled with ease and do not create sheet surface roughness. The optimum fiber thickness is about 3 to 30 μm.

It is often found advisable to further modify the composition by adding to the PET another polymeric material, namely, either a dipolymer of ethylene with an ethylenically unsaturated carboxylic acid or a terpolymer of ethylene with an unsaturated carboxylic acid and with an ester of an ethylenically unsaturated carboxylic acid or with a vinyl ester. The proportion of the carboxylic acid in the dipolymer is about 2-20 weight percent and the respective proportions of the carboxylic acid and of the ester in the terpolymer are about 1-30 weight percent of each, and the amount of the dipolymer or terpolymer is about 1-20% based on the weight of the final, reinforced polymer composition. The carboxylic groups of the dipolymer or terpolymer can either be free or can be converted to their salt form, the cation being a divalent metal ion. Suitable metal ions are, among others, calcium, zinc, and magnesium. Such partially or completely neutralized carboxylated polymers are well known to the art under the generic name "ionomers". Preparation of such materials is described, among others, in U.S. Pat. Nos. 3,264,272 to Rees and 3,639,527 to Brinkmann et al., and some ionomers are commercially available. Typical unsaturated carboxylic acids include: acrylic, methacrylic, maleic, and fumaric acids, 3-butenoic and 4-pentenoic acids, and itaconic and aconitic acids. Typical esters include, for example, methyl acrylate, ethyl methacrylate, isobutyl acrylate, diethyl fumarate, dimethyl maleate, and vinyl acetate. The preferred amount of the carboxylic acid copolymer or terpolymer is about 3-10 weight % of the reinforced polymer composition.

A fiber-reinforced PET sheet extruded in conventional equipment where the extruder die temperature does not vary more than about 5° C. side to side (from one face of the sheet being extruded to the other) by any conventional process has a balanced fiber distribution side to side, which means that both the fiber concentration and the fiber alignment in the polymer matrix are symmetrical about an imaginary plane bisecting the sheet through the center of its thickness. Should one face of the sheet be thermally or mechanically disturbed either during the extrusion itself or while being handled and/or cooled following the extrusion, unbalanced fiber distribution may result. Although balanced fiber distribution can be demonstrated by microscopic examination of a cross-section, it can also be proved indirectly by the absence of significant warpage on heating and cooling a supported sheet.

The amorphous, fiber-reinforced PET layer of the composite sheets of the present invention preferably is about 0.76-3.2 mm thick. The layer of amorphous copolyester adhesive material usually will be about 2-10 mil (0.05 to 0.25 mm) thick. The copolyester normally will be compatible with PET and will form strong bonds with it. The preferred copolyester is a terpolymer of terephthalic acid, ethylene glycol, and 1,4-cyclohexanedimethanol, which is sold by Eastman Kodak Co. under the name "KODAR" PETG. It is solid at room temperature but has a glass transition temperature of about 81° C. Other suitable copolyesters are products of Goodyear Tire & Rubber Co. sold as "Vitels".

Generally, the copolymer will be a polymeric product of at least three monomers at least one of which is terephthalic acid and at least one of which is ethylene glycol, while the remaining monomers may be either other dicarboxylic acids or other diols. The copolyester must be amorphous at all temperatures and should have a glass transition temperature of below about 95° C. It should be able to withstand short exposure to a temperature of about 260°-270° C. without significant degradation. In the case of "KODAR" PETG and similar polyesters, a suitable material should have an inherent viscosity of at least 0.6 dL/g to withstand the high paint bake oven temperature (about 160° C.), but lower molecular weight (lower inherent viscosity) polyester may be satisfactory for lower temperature bake oven operations.

It has been found that coextrusion of amorphous copolyester and fiber-reinforced PET into a composite sheet is not a suitable technique for making the thermoformable sheets of the present invention. On the one hand, the PET layer in such composite sheets no longer has a balanced fiber distribution; and, on the other hand, the copolyester material tends to thermally degrade in the extruder and is no longer a good adhesive. It is theoretically possible to coat the fiber-reinforced amorphous PET base sheet with the amorphous copolyester applied from solution or from melt, but such techniques would not be practical for anything but very thin coatings. One would have to be careful not to induce crystallization of PET in contact with the solvent or with the adhesive melt.

The process of the present invention involves lamination of a sheet of amorphous copolyester to a sheet of fiber-reinforced PET at a temperature at which PET is in a molten state.

Referring to the drawing, glass fiber-reinforced PET sheet S1 is extruded through die D placed about 11.25 cm from the nip between rolls R1 and R2 of a conventional three-roll finisher having smooth-surfaced rolls of identical diameter (about 30 cm) rotating at a surface speed of about 90 cm per min. Roll R1 is maintained at about 18° C., roll R2 at about 60° C., and roll R3 at about 21° C. The nip gap is adjusted to a width which is about 10-20 mils (0.25 to 0.51 mm) less than the desired thickness of the composite sheet. Sheet S1 exiting die D is at a temperature of about 265° C. A sheet S2 of Eastman Kodak PETG film is unwound from roll R4 and fed into the nip between rolls R1 and R2 of the finisher and contacts sheet S1 at a temperature at which PET still is molten, so that a perfect bond is formed between sheet S1 and film S2 over the complete contact area. The resulting composite sheet S3 is quenched on rolls R2 and R3 to prevent crystallization of PET and wound up on spools or cut to desired sizes as required.

A certain minimum thickness of amorphous copolyester is required to assure adequate bonding of fiber-reinforced PET sheets to one another in the thermoforming process. Normally, about 0.13 mm is the minimum effective thickness of adhesive. More than about 0.76 mm is not recommended because a thick layer of adhesive may significantly change the stiffness of a thermoformed article made of fiber-reinforced PET. In practice, the sheets used to form both the face member and the backing member are adhesive layer-containing composite sheets, which are placed in the thermoforming mold so that the adhesive sides face each other. The thickness of the adhesive layer in each sheet may be different, provided the total thickness is at least about 0.13 mm. The adhesive layer on one sheet, for example, on the backside of the face member, may be as thin as about 0.013 mm. It has been unexpectedly found that warpage of thermoformed articles is minimized when the adhesive is applied to the face member as a thin layer and to the backing member as a thicker layer.

This invention is now illustrated by the following representative example:

Glass fiber-reinforced sheeting was extruded in a conventional twin-screw extruder maintained at a barrel temperature of 265°–270° C. through a die heated to 275° C. and taken up on a three-roll finisher maintained at the above-indicated temperatures. The sheet composition was as follows:

PET: 65 wt. %
Ionomer: 5 wt. %
glass fiber: 30 wt. %

Poly(ethylene terephthalate) was Goodyear "Cleartuf" 7202A resin having inherent viscosity of 0.72 dL/g, as determined at 25° C. at a concentration of 0.32 g/100 mL in a mixture of 25 vol. % of trifluoroacetic acid and 75 vol. % of methylene chloride; and glass fibers were Owens-Corning-Fiberglass 416×15 chopped strands, 3/16 inch (4.8 mm) long, which had an average diameter of 9.5 μm. Those glass fibers were broken up in the extruder to fragments having an average length of about 300 μm, as determined by ashing an extruded sample and counting and measuring the glass fibers under the microscope. Their average length-to-diameter ratio thus was about 31.

The ionomer was a commercial copolymer of 80% of ethylene, 10% of methacrylic acid, and 10% of isobutyl acrylate neutralized to an extent of 73% with zinc ions.

The sheeting had an average thickness of either 45 mils (1.14 mm) or 60 mils (1.52 mm) and had a crystallinity of less than 5%, as determined by its density measurements.

Representative composite sheets formed according to the above-described process were tested for balanced fiber distribution according to the ASTM Standard D1181. The 4×4 inch (10.2×10.2 cm) test samples had a base layer of fiber-reinforced 60 mil-(1.52 mm)-thick PET sheet and a layer of adhesive copolyester sheet of variable thickness. The composite sheets were heated in a press for one minute at 150° C. and 50 psi (3.4 MPa) contact pressure and allowed to cool to room temperature. Warpage values, in mm, were obtained for each sample in triplicate. Warpage of no more than about 4 mm is considered acceptable and indicates balanced fiber distribution. The following composite sheets were tested and warpage values were obtained:

| Sample No. | | 1 | 2 | 3 | 4 |
|---|---|---|---|---|---|
| Sample Composition | PET | 65 | 65 | 70 | 70 |
| (%) | Ionomer | 5 | 5 | 6 | 6 |
| | Fibers | 30 | 30 | 24 | 24 |
| Copolyester Thickness (mm) | | 0.05 | 0.51 | 0.13 | 0.03 |
| Warpage (mm) | | 6.9 | 2.6 | 3.7 | 0.9 |

Sample No. 1 was coextruded, while the remaining samples were laminated as described above. The high warpage value of Sample No. 1 indicates unbalanced fiber distribution in the PET sheet.

The copolyester was a film of Eastman Kodak "Kodar" PETG Copolyester 6763, which had an inherent viscosity of 0.62 dL/g.

Composite sheets formed from these two sheets according to the above-described process were used to thermoform in a single mold a hollow 40 cm×40 cm×2.5 cm panel. The copolyester layer was 0.025 mm thick on the sheet used to make the face member and 0.38 mm thick on the sheet used to make the backing member. Several test panels were made using the process of U.S. Pat. No. 3,953,358. In most panels both the face member and the backing member were of the same thickness, especially 1.52 mm. In some test panels thinner sheets (1.14 mm) or sheets of unequal thickness (1.14 and 1.52 mm) were employed. While both the face sheet and the backing sheet were flat, the adhesive layer on the backing sheet was grooved. Both sheets were preheated to about 80° C., placed in the open mold, and equilibrated for about 5 seconds before the mold was closed. The mold temperature was about 130°–135° C. After the mold was closed and clamped, a vacuum of at least 84 KPa was applied to each mold half and held for a few seconds. Compressed air was then introduced between the sheets at a pressure of about 690 KPa. After about 30 seconds, compressed air was vented, and the vacuum on the back side of the backing sheet was released. The backing member was then moved into contact with the face member. Contact was maintained for about 30 seconds and the backing mold plate was withdrawn. Vacuum was then released and the resulting article was removed.

The PETG bonds were evaluated by measuring thermoformed panel deflection after applying a known load along the center line of the panel as well as by determining "long term" waviness of the panel as made and then after painting and drying in an oven maintained at 250° F. (121° C.). These tests were conducted as follows:

Panel Deflection Test

The test panel was supported below the crosshead of an Instron tensile tester along opposite edges of the panel by wood boards 1.3 cm wide, 3.0 cm high, and 46 cm long. A line load was applied to the center line of the panel between the supported edges by a wood board measuring 9×9×46 cm. The surface of the board in contact with the test panel was convex, rather than flat. This board was attached to a load cell mounted on the crosshead of the Instron tester. Load was applied by moving the crosshead down to compress the panel. Deflection of the panel was measured by a dial indicator mounted on the bottom center point of the panel.

Five panels were tested in this manner. They showed no bond failure under a line load of 800 N (newtons). Average panel deflection at this load level was 2.5 mm.

Long Term Waviness Test

"Long term waviness" is readily observable waviness on macro scale, rather than minute surface waviness which can be seen mainly or only with the aid of instruments such as planimeters or microscopes. A qualitative test for long term waviness can be performed as follows: An exposed photographic film of appropriate size (for example, an X-ray film plate) having a series of parallel, diagonal, straight, black lines on its surface is uniformly illuminated through a ground glass light panel. The opposite test panel is held against the film at the right angle, and its surface is viewed in the direction of the film. A perfectly flat surface presents a reflected image of straight parallel lines. Surface waviness causes distortion of the lines, which appear wavy. The degree of waviness is rated on an arbitrary scale of 1 to 10, where 10 designates a surface without detectable waviness, and 1 designates surface waviness in which the amplitude of waviness of the deflected lines is at least 1.25 cm. Test panels having a rating of 5 (amplitude of 3.2–6.3 mm) or better are judged satisfactory. Of twenty-four test panels having a 1.52 mm thick face member and 1.52 mm thick backing member, one had a rating of 9 prior to painting; one had a rating of 9 after painting; and the others had a rating of 5 or 7, with 7 predominating.

Of five panels having a 1.14 mm thick face member and 1.52 mm thick backing member, one had a rating of 3 before painting, and the others had a rating of 5 or 7. Four of those panels were painted (including the 3-rated panel) and had ratings of 5 or 7.

Of five panels having a 1.52 mm thick face member and 1.14 mm thick backing member, one had a rating of 7 and the others a rating of 9 prior to painting. Four of those test panels were painted and had a rating of 7.

Of five test panels having both the face and the backing members of the same thickness, 1.14 mm, one had a rating of 9 prior to painting, and the others had a rating of 5 or 7. Three of those panels were painted and had ratings of 5 or 7.

We claim:

1. A thermoformable composite sheet having a base layer of fiber-reinforced amorphous poly(ethylene terephthalate) in which the fiber distribution is balanced side to side and a layer of an amorphous thermoplastic, adhesive copolyester material firmly attached to one side of said base layer, the thickness of said adhesive layer being at most about 35% of the thickness of said composite sheet.

2. A sheet of claim 1 wherein the base layer is reinforced with glass fibers.

3. A sheet of claim 2 wherein the average length-to-diameter ratio of the fibers is about 10–35.

4. A sheet of claim 3 wherein the average fiber diameter is about 3–30 μm.

5. A sheet of claim 1 wherein the weight of the fibers is about 5–50% of the weight of the fiber-reinforced poly(ethylene terephthalate) layer.

6. A sheet of claim 5 wherein the weight of the fibers is about 10–35% of the weight of the fiber-reinforced poly(ethylene terephthalate) layer.

7. A sheet of claim 1 wherein the fiber-reinforced poly(ethylene terephthalate) layer also contains about 1–20% of the weight of the total composition of a dipolymer of ethylene with an ethylenically unsaturated carboxylic acid, wherein the proportion of the carboxylic acid in the dipolymer is about 2–20 weight percent, or a terpolymer of ethylene with an unsaturated carboxylic acid and with an ester of an ethylenically unsaturated carboxylic acid or with a vinyl ester, wherein the respective proportions of the carboxylic acid and of the ester are about 1–30 weight percent each.

8. A sheet of claim 1 wherein the thickness of the fiber-reinforced poly(ethylene terephthalate) layer is about 0.76–3.2 mm, and the thickness of the adhesive material is about 0.05–0.25 mm.

9. A composite sheet of claim 1 wherein the copolyester is a polymeric product of at least three monomers, at least one of which is terephthalic acid and at least one of which is ethylene glycol, while the remaining monomers are other dicarboxylic acids or other diols; said copolyester having a glass transition temperature below about 99° C. and being able to withstand a short exposure to a temperature of about 260°–270° C. without significant degradation.

10. A composite sheet of claim 9 wherein the copolyester is a terpolymer of terephthalic acid, ethylene glycol, and 1,4-cyclohexanedimethanol.

* * * * *